US011620447B1

(12) United States Patent
Buda et al.

(10) Patent No.: US 11,620,447 B1
(45) Date of Patent: Apr. 4, 2023

(54) METHOD FOR MORE ACCURATELY PERFORMING AN AUTOCOMPLETE FUNCTION

(71) Applicant: Koa Health B.V., Barcelona (ES)

(72) Inventors: Teodora Sandra Buda, Barcelona (ES); Joao Guerreiro, Lisbon (PT); Aleksandar Matic, Lloret de Mar (ES); Albert Garcia i Tormo, Barcelona (ES)

(73) Assignee: Koa Health B.V., Barcelona (ES)

( * ) Notice: Subject to any disclaimer, the term of this patent is extended or adjusted under 35 U.S.C. 154(b) by 0 days.

(21) Appl. No.: 17/708,776

(22) Filed: Mar. 30, 2022

(30) Foreign Application Priority Data

Feb. 8, 2022 (EP) .................................. 22155712

(51) Int. Cl.
*G06F 40/274* (2020.01)
(52) U.S. Cl.
CPC .................. *G06F 40/274* (2020.01)
(58) Field of Classification Search
CPC .... G06F 3/0482; G06F 3/04842; G06F 40/14; G06F 40/186; G06F 40/258; G06F 40/56; G06F 16/211; G06F 11/366; G06F 40/205; G06F 40/263; G06F 40/279; G06F 40/30; G06F 40/35; G06N 5/022; G06N 3/08; G06N 5/02; G06N 20/00; G06N 7/005; G06N 3/0427; G06N 3/0454; G06N 3/0445; G06N 5/045; G06N 3/04; G06N 3/088; G06N 20/10; G06N 3/006; G06N 3/0472; G06N 3/082; G06N 3/084; G06N 5/003; G06N 5/025; G06N 5/046
See application file for complete search history.

(56) References Cited

U.S. PATENT DOCUMENTS

| 7,685,144 B1 | 3/2010 | Katragadda | G06F 17/30 707/101 |
| 9,009,030 B2 | 4/2015 | Wang et al. | G06F 17/27 704/10 |
| 9,223,497 B2 | 12/2015 | Pasquero et al. | G06N 7/02 |

(Continued)

OTHER PUBLICATIONS

Extended European Search Report dated Jun. 24, 2022, from the European Patent Office in the related foreign application EP22155712.7 citing the references A-D above (11 pages).

*Primary Examiner* — Rayeez R Chowdhury
(74) *Attorney, Agent, or Firm* — Imperium Patent Works; Darien K. Wallace

(57) ABSTRACT

An autocomplete function for textual input uses situational parameters to predict the next words the user is intending to type. Situational and temporal parameters are based on textual input and sensor data of the user. A past time window is based on the situational and temporal parameters. Historical textual input and sensor data during the time window relating to the situational parameters are retrieved from a storage device and aggregated. A pre-existing model that relates the situational parameter to the time window is used to select a situational value based on the textual input and sensor data. Words relating to the situational parameter are listed that the user is likely to input next based on the selected situational value. The words are ranked by the probability that the user is intending to type each of the words. The highest ranked word is displayed to the user on a user interface.

26 Claims, 5 Drawing Sheets

(56) References Cited

U.S. PATENT DOCUMENTS

| | | | |
|---|---|---|---|
| 9,779,080 B2 | 10/2017 | Caskey et al. | G06F 17/27 |
| 2013/0246329 A1* | 9/2013 | Pasquero | G06N 20/00 |
| | | | 706/52 |
| 2014/0035823 A1* | 2/2014 | Khoe | G06F 3/02 |
| | | | 345/171 |
| 2014/0067731 A1 | 3/2014 | Adams | G06F 15/18 |
| | | | 706/12 |
| 2014/0095419 A1 | 4/2014 | Gandhi et al. | G06N 5/02 |
| 2015/0067492 A1* | 3/2015 | Ozaki | G06F 40/274 |
| | | | 715/271 |
| 2015/0370780 A1 | 12/2015 | Wang et al. | G06F 17/27 |
| 2019/0050387 A1 | 2/2019 | Sanghavi et al. | G06F 17/27 |
| 2019/0324780 A1 | 10/2019 | Zhu et al. | G06F 9/451 |
| 2020/0012718 A1 | 1/2020 | Kung et al. | G06F 17/27 |
| 2022/0268964 A1* | 8/2022 | Choi | G06N 3/08 |

* cited by examiner

| TIME | NOISE | LIGHT | DISTANCE | STEPS |
|---|---|---|---|---|
| 10/29/21 21:00 | 10 | 5 | 0 | 20 |
| 10/29/21 22:00 | 10 | 5 | 0 | 30 |
| 10/29/21 23:00 | 10 | 5 | 0 | 0 |
| 10/30/21 00:00 | 10 | 5 | 0 | 0 |
| 10/30/21 01:00 | 10 | 5 | 0 | 0 |
| 10/30/21 02:00 | 10 | 5 | 0 | 0 |
| 10/30/21 03:00 | 10 | 5 | 0 | 0 |
| 10/30/21 04:00 | 10 | 5 | 0 | 0 |
| 10/30/21 05:00 | 10 | 5 | 0 | 0 |
| 10/30/21 06:00 | 10 | 5 | 0 | 0 |
| 10/30/21 07:00 | 10 | 5 | 0 | 0 |
| 10/30/21 08:00 | 50 | 25 | 3500 | 2.5 |
| 10/30/21 09:00 | 50 | 25 | 0 | 0 |
| 10/30/21 10:00 | 50 | 25 | 0 | 0 |
| 10/30/21 11:00 | 50 | 25 | 0 | 0 |
| 10/30/21 12:00 | 50 | 25 | 0 | 0 |
| 10/30/21 13:00 | 50 | 25 | 2500 | 1.8 |
| 10/30/21 14:00 | 50 | 25 | 2000 | 1.2 |
| 10/30/21 15:00 | 50 | 25 | 0 | 0 |
| 10/30/21 16:00 | 50 | 25 | 0 | 0 |
| 30.1 0.21 17:00 | 50 | 25 | 0 | 0 |
| 10/30/21 18:00 | 10 | 25 | 7200 | 5 |
| 10/30/21 19:00 | 10 | 25 | 0 | 0 |
| 10/30/21 20:00 | 10 | 25 | 0 | 0 |

FIG. 4

| average_noise_level | sum_steps | sum_distance | average_light_level |
|---|---|---|---|
| 30 | 15200 | 10.5 | 15 |

FIG. 5

METHOD FOR MORE ACCURATELY PERFORMING AN AUTOCOMPLETE FUNCTION

CROSS REFERENCE TO RELATED APPLICATION

This application is based on and hereby claims the benefit under 35 U.S.C. § 119 from European Patent Application No. EP 22155712.7, filed on Feb. 8, 2022, in the European Patent Office. This application is a continuation-in-part of European Patent Application No. EP 22155712.7, the contents of which are incorporated herein by reference.

TECHNICAL FIELD

The present invention relates to an improved and more accurate auto-complete mechanism that assists a user to interact with an electronic device, e.g., by typing.

BACKGROUND

Various services such as emailing, online chatting, and searching include word autocompletion functions that, based on input text coming from a user, predict what word the user is either trying to enter or what words might follow the current word.

The user typically can then quickly select which word or continuation is most relevant. If the predictions are accurate, the user can usually select the proper predicted word in less time than it would take for the user to finish typing the word. Thus, the autocomplete function reduces the amount of typing required of users interacting with their electronic devices, for example mobile devices such as smartphones or tablets, and thus provides a better user experience and also reduces the amount of time for producing the same sentence/wordings.

Typically autocomplete software (also referred to as an autocomplete mechanism or autocomplete model) takes into consideration the words or text inputted so far by the user, along with past historical textual inputs to predict the next word(s).

Most solutions for text auto completion tend to be personalized suggestions based on the user's previous input. Consequently, they tend to reproduce or mimic previous user inputs.

However, a user's context can change from day-to-day and even within the same day as the user changes his or her location (e.g., home to work), company or mood. Thus, often the words predicted by autocomplete mechanisms do not accurately reflect what the user actually intends to type. Thus, the use of autocomplete mechanisms has been hampered by an insufficient capability of such mechanisms accurately to predict what the user might want to type, e.g., in a particular situation or at a particular point in time.

It is the object of the present invention to alleviate or even eliminate the problems of the prior art. In particular, it is an object of the present invention to provide an improved, for example a more accurate, autocomplete mechanism.

SUMMARY

The present invention relates to a computer-implemented method for improving the accuracy of an autocomplete function. The invention relates to a method that tailors an auto-completion module or model to a user's current context that may be derived from passive sensors and/or external inputs.

A method for autocompleting a textual input of a user uses situational parameters to predict the next words the user is intending to type. The textual input of the user is received via a user interface of a smartphone of the user. A situational parameter relating to the user is generated based on the textual input and on sensor data from a user sensor, such as on the smartphone. The situational parameter relates to characteristics such as mood, physical location, surrounding environment, activity level, and social interaction. The situational parameter can be heart rate, breathing rate, noise level experienced by the user, light level experienced by the user, time of day, season, distance traveled by the user, number of steps taken by the user, and GPS coordinates locating the user. A temporal parameter is generated based on the textual input and on the sensor data. A time window in the past is defined based on the situational parameter and the temporal parameter. Historical textual input and historical sensor data that was acquired during the time window and that relates to the situational parameter is retrieved from a storage device. The historical textual input and the historical sensor data relating to the situational parameter that was acquired during the time window is aggregated.

If a pre-existing model exists that relates the situational parameter to the time window, the pre-existing model is used to select a situational value relating to the situational parameter based on the historical textual input and the historical sensor data that has been aggregated. If no pre-existing model exists that relates the situational parameter to the time window, the historical textual input and the historical sensor data relating to the situational parameter are aggregated in time slots of equal length to the time window. If no pre-existing model exists, a new language model is created using the historical textual input and the historical sensor data that has been aggregated. If no pre-existing model exists, the situational value relating to the situational parameter is selected using the new language model that has been created. A list of words that relate to the situational parameter is generated that the user is likely to input next based on the situational value that has been selected. The words of the list are ranked by the probability that the user is intending to type each of the words. The word ranked highest on the list is displayed to the user on the user interface. The words of the list are ranked using the pre-existing model or the new language model based on a combination of the probability of the user's intent and an association of the words with a targeted mental state of the user.

A system for autocompleting a textual input of a user includes a user interface, an analysis module, a time window determining module, a storage device, a model-implementing module, and a situational autocomplete module. The textual input is received from the user on the user interface. The analysis module generates a situational parameter of the user and a temporal parameter based on the textual input. The time window determining module defines a time window in the past based on the temporal parameter and the situational parameter. Historical textual input and historical sensor data that relates to the situational parameter was earlier acquired during the time window. The analysis module retrieves the historical textual input and historical sensor data from the storage device. The analysis module aggregates the historical textual input and the historical sensor data relating to the situational parameter that was acquired during the time window.

A model-implementing module determines whether, for the user, a pre-existing model exists that relates the situational parameter to the time window. The model-implementing module uses the pre-existing model, if the pre-existing model exists, to select a situational value from the situational parameter based on the historical textual input and the historical sensor data that has been aggregated. If no pre-existing model exists, the analysis module aggregates the historical textual input and the historical sensor data relating to the situational parameter in time slots of equal length to the time window. If no pre-existing model exists, the model-implementing module creates a new language model using the historical textual input and the historical sensor data that has been aggregated. If no pre-existing model exists, the analysis module selects the situational value from the situational parameter using the new language model that has been created. A situational autocomplete module generates a list of words that the user is likely to input next based on the situational value that has been selected. The words relate to the situational parameter. The situational autocomplete module ranks the words of the list by probability that the user is intending to type each of the words. A word that is ranked highest on the list is displayed to the user on the user interface. The words of the list are ranked using the pre-existing model or the new language model based on a combination of the probability of the user's intent and an association of the words with a targeted mental state of the user Other embodiments and advantages are described in the detailed description below. This summary does not purport to define the invention. The invention is defined by the claims.

BRIEF DESCRIPTION OF THE DRAWING

The accompanying drawings, where like numerals indicate like components, illustrate embodiments of the invention.

FIG. 4 is a table of exemplary passive data acquired from the user during the previous 24 hours.

FIG. 5 is a table listing the values of four exemplary features for the user.

DETAILED DESCRIPTION

Figure 1:
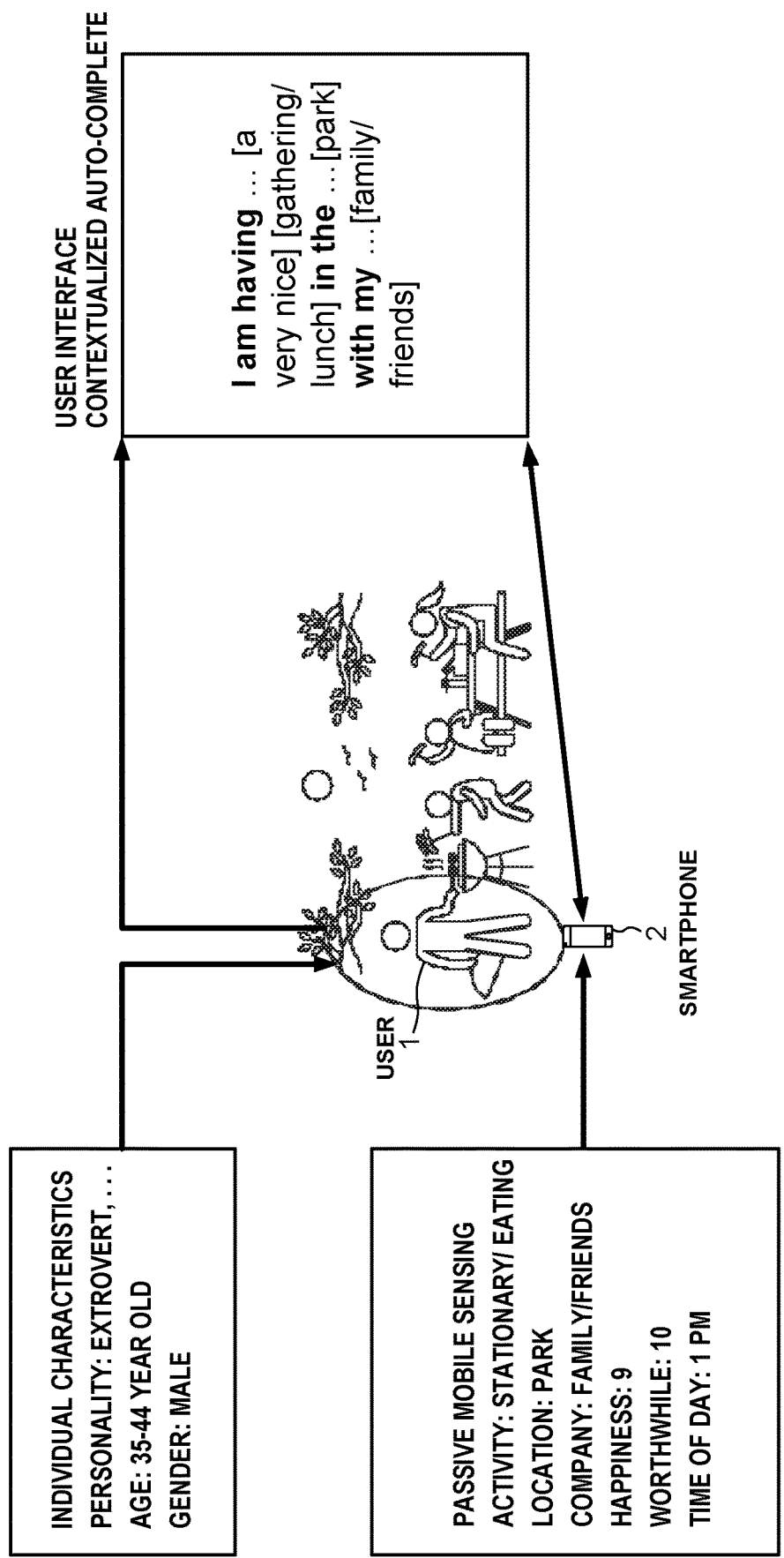
FIG. 1 illustrates the concept of an autocomplete mechanism according to the present invention that takes into account individual characteristics of the user and the situational context of the user, such as the current situation surrounding the user.

Reference will now be made in detail to some embodiments of the invention, examples of which are illustrated in the accompanying drawings.

A computer-implemented method for improving the accuracy of an autocomplete mechanism according to an embodiment of the present invention comprises the steps:
monitoring at least one situational parameter of a user;
receiving via a user interface input from the user,
extracting based on the input at least one temporal parameter and at least one situational category;
based on the at least one temporal parameter and/or the at least one situational category, determining at least one time window in the past for aggregating data relating to the at least one situational category;
retrieving data relating to the at least one situational category, preferably data relating to the at least one monitored situational parameter, acquired during the at least one time window from a storage device, and preferably retrieving data relating to the user from at least one external source;
aggregating the data relating to the at least one situational category acquired during the at least one time window;
evaluating if for the user at least one pretrained model relating to the at least one situational category and the at least one determined time window exists;
if at least one pretrained model exists, using the model to select at least one situational value from the at least one situational category based on the aggregated data;
if such a pretrained model does not exist, aggregating historical data relating to the at least one situational category in time slots of an equal length to the at least one time window and using the aggregated historical data to generate, preferably train, at least one model that is then used to select at least one situational value from the at least one situational category based on the aggregated data;
based on the selected at least one situational value, generating a first list of words the user is likely to input next and that relate to the at least one situational category;
ranking the words in the list by the probability that the user is intending to type each word; and
outputting to the user via the user interface a selected subset of the ranked words, preferably the most likely word and/or a number of the most likely words.

The novel method tailors an autocompletion mechanism or model to a user's current context that is derived from passive sensors and/or external inputs. This has the advantageous effect that each user receives autocomplete suggestions that are most appropriate to the user's current situational context, including, e.g., how they feel, where they are and/or who they are with.

Given a user text input, preferably suggestions in the form of text output are provided that are situationally context-aware and that include relevant information from the surrounding external environment of the user. To achieve this, the system or method preferably uses: a regular autocomplete model that provides a text autocompletion service, a dynamic window extraction method that extracts the relevant time window to look at for inferring the situational context and a model for inferring these contextual values from device sensing data aggregated over the dynamic window. Finally, the system or method involves user inputs that incorporate user feedback, e.g., regarding how accurately the suggested words provided by the method or system actually capture what the user intended to type, and preferably the user feedback is used to improve the accuracy of the autocomplete mechanism, for example, by using the feedback to construct more accurate labels for the contextual model.

The outputting of a selected subset of ranked words to the user via the user interface preferably means not only that a single word is output to the user, but also that multiple words, e.g., forming a short sentence or part of a sentence, may be output to the user. The input provided by the user can be completed via an autocomplete mechanism not only by single words but also by multiple words, e.g., forming a short sentence or part of a sentence, or phrases etc.

In an exemplary embodiment of a computer-implemented method, the situational parameter of a user that is monitored is the activity of the user that is monitored using, e.g., accelerometer data. The input received from the user via a user interface may be for example the user typing "I am feeling . . . ." Based on this input at least one temporal parameter is extracted that in this example relates to the present, because the user types "I am" rather than "during the last day . . . ," etc. Also at least one situational category is extracted that in this example may be the mood of the user, because the user refers to mood when typing "I am feeling . . . ."

Based on the at least one temporal parameter and/or the at least one situational category, in this example based on the extracted information that the user refers to a mood in the present, at least one time window in the past is determined. For example, the time window can relate to the past one hour because the user usually writes about his/her feelings in the past hour. Because the time window is not fixed, and different time windows may be determined depending on the situational category the user refers to (e.g., past 1 hour if the user refers to his/her feelings and past 8 hours if the user refers to his/her work) the time window may be regarded as a dynamic time window. In other words, the time window may not be fixed or constant but dynamically changes depending on the situational category the user refers to.

Then, data relating to the at least one situational category, in this example the mood of the user, preferably data relating to the at least one monitored situational parameter, in this example the activity of the user, acquired during the at least one time window, in this example the last one hour, are retrieved from a storage device. For example, it may be known that high activity levels lead to a better mood of a user, so knowing the past activity level of a user may prove helpful in predicting the words the user may chose when describing his/her feelings. Preferably data relating to the user from at least one external source are also retrieved, e.g., indicating the user's age, as for example a certain activity level may be delightful for a 20-year-old but stressful for a 90-year old. The data relating to the at least one situational category, in this example the mood of the user, acquired during the at least one time window, in this example the last one hour, are aggregated.

It is evaluated whether, for the user, at least one pretrained model relating to the at least one situational category and the at least one determined time window exists. For example, such a pretrained model may indicate based on past experience what mood the user reported when referring to different time slots corresponding to the dynamic time window. The pretrained model may indicate that the user is likely to report feeling tired after a very high level of activity and noise in the past one hour or that the user is likely to report feeling relaxed after a moderate level of activity and a low level of noise in the past one hour. If such a pretrained model exists for the user, the model may be used to select at least one situational value, for example "tired", from the at least one situational category, for example the category "mood", based on the aggregated data, for example the activity level determined by accelerometer over the last one hour. If such a pretrained model does not exist, preferably historical data relating to the at least one situational category in time slots of an equal length to the at least one time window are aggregated, and the aggregated historical data are used to generate, preferably train, at least one model that is then used to select at least one situational value from the at least one situational category based on the aggregated data.

Based on the selected at least one situational value, for example "happy", a first list of words the user is likely to input next and that relate to the at least one situational category is generated. For example, if the situational value is "happy" the list may contain the words "happy", "enthusiastic" and "relaxed" that all relate to a happy mood of the user and that the user thus is likely to input next. The words in the list are ranked by the probability that the user is intending to type each word, and a selected subset of the words, for example the two most likely words are output to the user via the user interface.

This example, however, serves only to illustrate one embodiment. In other embodiment, the autocomplete mechanism assists a user to input instructions or reports into a machine, for example by typing into a user interface. Generally, the invention offers the advantage of improving user-machine-interaction by reducing the amount of time required by the user for inputting instructions and/or information into a machine. For many technical applications, the speed of inputting instructions is essential.

According to an embodiment, a novel method includes the steps: generating a second list of words the user is likely to input next based on the input received from the user; and merging the first and second lists of words to generate an integrated list of words that the user is likely to input next, wherein the words in the integrated list are ranked by the probability that the user is intending to type each word.

For example, the second list of words may be generated by a autocomplete mechanism that does not consider the situational context of the user, such as the location the user is at or the company that the user keeps. The autocomplete mechanism used for generating the second list of words may be an autocomplete mechanism known from the prior art.

According to an embodiment, a novel method includes the steps: receiving feedback from the user regarding the selected subset of words output to the user via the user interface, wherein the feedback in particular relates to how well the words capture the at least one situational category, and using the feedback provided by the user to improve the at least one pretrained model and/or to generate the at least one model that is then used to select at least one situational value from the at least one situational category based on the aggregated data.

The user can be prompted to provide feedback by issuing a prompt on the user interface of a device the user is interacting with. For example, the user may be requested to indicate on a scale of 1 to 10 how accurately the words suggested by the method actually reflect what the user intended to type.

According to an embodiment, the at least one time window is determined based on an explicit input by the user, an inherent temporal component contained in the input of the user and/or a defined default time window. For example, an explicit input from the user might be "in the last one hour . . . ." The time window may be set as relating to the past one hour. If the user types "during the last shift . . . ," this may include the inherent temporal component of "the last 6 hours" because it is known that the last shift lasted for the last 6 hours. Default time windows may also be used, for example, if the user refers to "sleep", by default the time window is set to include eight hours of the last night. If the user refers to activity, the default time window may be set to refer to the last one hour. Different situational categories may correspond to different time windows (e.g., "activity" may be linked to the last 1 hour, and "work" may be linked to the past 6 hours or the past 8 hours). For multiple situational parameters and/or situational categories, multiple time windows may be determined that may all be the same or be different from each other.

According to an embodiment, the at least one situational category is extracted based on at least one default value, wherein the default value is preferably linked to the input. For example, it may be the case that a user enters input into the user interface of a certain device to provide input referring to only one situational category. For example, a user may type in his/her electronic diary only to report his/her feelings. Thus, by default, the situational category "mood" or "feeling" may be set for input of the user into his/her electronic diary. The default value may be linked to the user input, for example if when the user types "I am", he/she usually refers to the situational category "mood" or "feeling" but when the user types "today . . . ", he/she usually refers to the situational category "activity".

The situational category may relate to a mood, a location, an environment, an activity level, a social interaction and/or a physiological parameter, such as a heart rate or breathing rate, a position, a GPS coordinate, a noise level, a light level, a season, a time of day, a distance travelled, a number of steps taken or the company that the user keeps. These, however, are only examples and should not be construed to limit the invention.

According to an embodiment, at least one characteristic of the user such as demographic information, age, sex, ethnicity, personality type, profession is used to generate a pretrained model or other model that is then used to select a situational value from a situational category based on the aggregated data. The at least one characteristic of the user may be taken from an electronic record of the user. These are only examples and should not be construed to limit the invention.

According to an embodiment, the word or words output to the user are selected to induce the user to provide a specific input, preferably to provide a specific input in the future, wherein the specific input preferably is set by the user or an external source and/or the word or words output to the user are selected preferably based on stored data linking an input provided by the user to an activity and/or content the user is or has been exposed to.

For example, the user is induced regularly to run a maintenance program on a machine/device to extend the useful life time of the device or machine. Thus, the word or words output to the user may be selected to induce the user to provide input relating to an instruction for performing a maintenance program. The specific input may be set in this example by an external, such as an engineer overseeing the running of the device or machine. For example, if the user types "I am . . . " into the user interface of the device or machine, the words output to the user as an autocompletion may be " . . . going to run a maintenance program" to induce the user to actually run a maintenance program. Alternatively, the words output to the user as an autocompletion may be " . . . going to perform a system check" because stored past data links the activity of performing a system check to the subsequent input of an instruction for performing a maintenance program by the user. Alternatively, the words output to the user as an autocompletion may be " . . . going to have an accident" because stored past data links the content relating to an accident to the subsequent input of an instruction for performing a maintenance program by the user.

In another example, a user who repeatedly reported feeling tired shall be induced to report feeling awake. If the user types "I am . . . ", the words output to the user as an autocompletion may be " . . . going to sleep for 8 hours" because stored past data links the activity of sleeping 8 hours to the subsequent input of the term "awake" when the user reports his/her feelings. Alternatively, the words output to the user as an autocompletion may be " . . . going to the bedroom" because stored past data links the content relating to the bedroom to the subsequent input of the term "awake" when the user reports his/her feelings.

Another aspect of the invention relates to a system or device configured to perform any of the novel methods disclosed herein. A system for improving the accuracy of an autocomplete mechanism includes:

a monitoring unit configured to monitor at least one situational parameter of a user;

a user interface for receiving input from the user and outputting content to the user;

an extraction unit, configured to extract based on the input received from a user at least one temporal parameter and at least one situational category;

a time window determining unit, configured to, based on the at least one temporal parameter and/or the at least one situational category, determine at least one time window in the past for aggregating data relating to the at least one situational category;

a situational context determining unit configured to retrieve data relating to the at least one situational category, preferably data relating to the at least one monitored situational parameter acquired during the at least one time window from a storage device and aggregate the data relating to the at least one situational category acquired during the time window;

a storage or memory containing at least one pretrained model configured to select at least one situational value from the at least one situational category based on the aggregated data and/or a model that is generated, preferably trained, by a model generating unit to select at least one situational value from the at least one situational category based on the aggregated data based on historical data relating to the at least one situational category aggregated in time slots of an equal length to the time window;

a situational autocomplete unit, configured to, based on the at least one selected situational value, generate a first list of words that the user is likely to input next and that relate to the at least one situational category and to rank the words in the list by the probability that the user intends to type each word and to output to the user via the user interface a selected subset of the ranked words, preferably the most likely word and/or a number of the most likely words.

According to an embodiment, the system also includes an input-based autocomplete unit configured to generate a second list of words the user is likely to input next based on the input received from the user and an integration unit configured to merge the first and second lists of words to generate an integrated list of words that the user is likely to input next. The words in the integrated list are ranked by the probability that the user intends to type each word based on the input received from the user and the retrieved data relating to the at least one situational parameter.

The input-based autocomplete unit may be realized by an autocomplete mechanism that suggests words to the user without considering the situational context of the user.

According to an embodiment, the system further includes a feedback unit configured to receive feedback from the user regarding the selected subset of words output to the user via the user interface, wherein the feedback in particular relates to how well the words capture the at least one situational category. The feedback provided by the user is used by the model generating unit to improve the at least one pretrained model and/or to generate, preferably train, the at least one model that is then used to select at least one situational value from the at least one situational category based on the aggregated data.

Preferably, the time window determining unit is configured to determine the at least one time window based on an explicit input by the user, an inherent temporal component contained in the input of the user and/or a defined default time window.

According to an embodiment, the extraction unit is configured to extract the at least one situational category based on at least one default value, wherein the default value is preferably linked to the input.

Preferably, the time window determining unit is configured to determine for multiple situational parameters and/or situational categories multiple time windows that may all be the same or be different from each other.

According to an embodiment, the situational autocomplete unit is configured to select the word or words output to the user to induce the user to provide a specific input, wherein preferably the specific input is set by the user or an external source and/or the selection is preferably based on stored data linking an input provided by the user to an activity and/or content the user is exposed to.

In another embodiment, a method for autocompleting a textual input of a user involves receiving the textual input of the user via a user interface of a smartphone of the user. A situational parameter relating to the user is generated based on the textual input and on sensor data from a user sensor, and a temporal parameter is generated based on the textual input and on the sensor data. A time window in the past is defined based on the situational parameter and the temporal parameter. Historical textual input and historical sensor data acquired during the time window and relating to the situational parameter are retrieved from a storage device. The historical textual input and the historical sensor data relating to the situational parameter that was acquired during the time window are aggregated. It is determined whether, for the user, a pre-existing model exists that relates the situational parameter to the time window.

If the pre-existing model exists, the pre-existing model is used to select a situational value relating to the situational parameter based on the historical textual input and the historical sensor data that has been aggregated. If no pre-existing model exists, the historical textual input and the historical sensor data relating to the situational parameter are aggregated in time slots of equal length to the time window. If no pre-existing model exists, a new language model is created using the historical textual input and the historical sensor data that has been aggregated. If no pre-existing model exists, the situational value relating to the situational parameter is selected using the new language model that has been created.

A first list of words that the user is likely to input next is generated based on the situational value that has been selected such that the words relate to the situational parameter. The words of the first list are ranked by probability that the user is intending to type each of the words. A word ranked highest on the first list is displayed to the user on the user interface.

According to an embodiment, the user sensor is selected from the group consisting of: a sensor on the smartphone of the user, a sensor on a wearable device of the user, and a sensor on a personal electronic device of the user.

According to an embodiment, the words of the first list are ranked using the pre-existing model or the language model based on a combination of the probability of the user's intent and an association of the words with a targeted state, such as a mental state, of the user.

According to an embodiment, the words of the first list are ranked based on a combination of the probability that the user is intending to type each of the words and an association of the words with a targeted state, such as a mental state, of the user.

According to an embodiment, the novel method also involves generating a second list of words that the user is likely to input next based on the textual input of the user received via the user interface. Then the first list and the second list are merged to generate an integrated list of words that the user is likely to input next. The words of the integrated list are ranked by probability that the user is intending to type each word.

The method also involves receiving feedback from the user regarding the word displayed to the user on the user interface. The feedback indicates whether the word is related to the situational parameter. The feedback is used to improve the pre-existing model if the pre-existing model exists. The feedback is used to create the new language model if no pre-existing model exists.

According to an embodiment, the time window is defined in part based on an explicit input by the user. In another embodiment, the time window is defined as a default time window.

According to an embodiment, the situational parameter is generated in part based on a default value that is associated with the textual input.

In another embodiment, the method also involves generating a second situational parameter based on the textual input. Historical textual input and historical sensor data relating to the second situational parameter are retrieved. The historical textual input and the historical sensor data relating to the situational parameter and the second situational parameter are aggregated.

Preferably, a second time window is defined based on the second situational parameter.

According to an embodiment, the situational parameter relates to a characteristic selected from the group consisting of: a mood, a physical location, a surrounding environment, an activity level, and a social interaction.

According to an embodiment, the situational parameter involves a parameter related to the user selected from the group consisting of: a heart rate, a breathing rate, a GPS coordinate, a noise level experienced by the user, a light level experienced by the user, a time of day, a season, a distance traveled by the user, a number of steps taken by the user, and an employer of the user.

According to an embodiment, the language model is created in part using a characteristic of the user selected from the group consisting of: age, sex, ethnicity, demographic group, profession, personality type and physical condition indicated in electronic health records.

In one embodiment, the word displayed to the user on the user interface is selected from the first list based on an activity undertaken by the user in the past. In another embodiment, the word displayed to the user on the user interface is selected from the first list based on a predicted future activity of the user.

According to an embodiment, the storage device stores a database of electronic health records. The storage device is part of a storage system.

According to an embodiment, the novel method also involves retrieving from the storage device electronic records relating to the user and then using the pre-existing model to select the situational value based in part on the electronic records.

Another aspect of the invention relates to a system for autocompleting a textual input of a user that includes a user interface, an analysis module, a time window determining module, a storage device, a model-implementing module, and a situational autocomplete module. The textual input is received from the user on the user interface. The analysis module generates a situational parameter of the user and a temporal parameter based on the textual input. The time window determining module defines a time window in the past based on the temporal parameter and the situational parameter. The analysis module retrieves historical textual input and historical sensor data from the storage device. The historical textual input and historical sensor data was acquired during the time window and relates to the situational parameter. The analysis module aggregates the historical textual input and the historical sensor data relating to the situational parameter that was acquired during the time window.

The model-implementing module determines whether, for the user, a pre-existing model exists that relates the situational parameter to the time window. The model-implementing module uses the pre-existing model, if the pre-existing model exists, to select a situational value from the situational parameter based on the historical textual input and the historical sensor data that has been aggregated. If no pre-existing model exists, the analysis module aggregates the historical textual input and the historical sensor data relating to the situational parameter in time slots of equal length to the time window. The model-implementing module creates a language model, if no pre-existing model exists, using the historical textual input and the historical sensor data that has been aggregated. The analysis module selects, if no pre-existing model exists, the situational value from the situational parameter using the language model that has been created. The situational autocomplete module generates a first list of words that the user is likely to input next based on the situational value that has been selected. The words relate to the situational parameter. The situational autocomplete module ranks the words of the first list by probability that the user is intending to type each of the words. A word that is ranked highest on the first list is displayed to the user on the user interface.

In an embodiment relating to a system, the words of the first list are ranked using the pre-existing model or the language model based on a combination of the probability of the user's intent and an association of the words with a targeted state, such as a mental state, of the user.

In another embodiment, the words of the first list are ranked based on a combination of the probability that the user is intending to type each of the words and an association of the words with a targeted state, such as a mental state, of the user.

According to another embodiment, the situational parameter relates to a characteristic selected from the group consisting of: a mood, a physical location, a surrounding environment, an activity level, and a social interaction.

According to another embodiment, the situational parameter involves a parameter related to the user selected from the group consisting of: a heart rate, a breathing rate, a GPS coordinate, a noise level experienced by the user, a light level experienced by the user, a time of day, a season, a distance traveled by the user, a number of steps taken by the user, and an employer of the user.

According to another embodiment, the language model is created in part using a characteristic of the user selected from the group consisting of: age, sex, ethnicity, demographic group, profession, personality type and physical condition indicated in electronic records.

According to another embodiment, the word displayed to the user on the user interface is selected from the first list based on an activity undertaken by the user in the past.

According to another embodiment, the word displayed to the user on the user interface is selected from the first list based on a predicted future activity of the user.

FIG. 1 illustrates an exemplary application of the system, where a user 1 who is enjoying a lunch in the park with family wants to share this information via a text message through an app on his/her smartphone (regardless of whether to one recipient or a broad audience). As the user 1 is typing "I am having . . . ," a system for autocompletion that is implemented on the smartphone 2 of the user 1 autocompletes the sentence with the contextual values "a very nice", "gathering/lunch", "park" and "family friends" for the contextual categories mood, activity, location and company. In this example, the system uses data relating to individual characteristics of the user, such as age, gender, etc. and data from sensors associated with the user, such as an accelerometer or GPS tracker present in the smartphone 2, to tailor the output of the autocomplete mechanism to the individual user and his/her current situation to improve the accuracy of the autocomplete mechanism. In FIG. 1 the acquisition of data by the smartphone 2 is labeled as "passive mobile sensing" because the data is preferably acquired passively, in particular without any conscious or explicit input having been provided by the user 1. For example, the user does not actively have to log a GPS position, but this position is automatically tracked.

Figure 2:
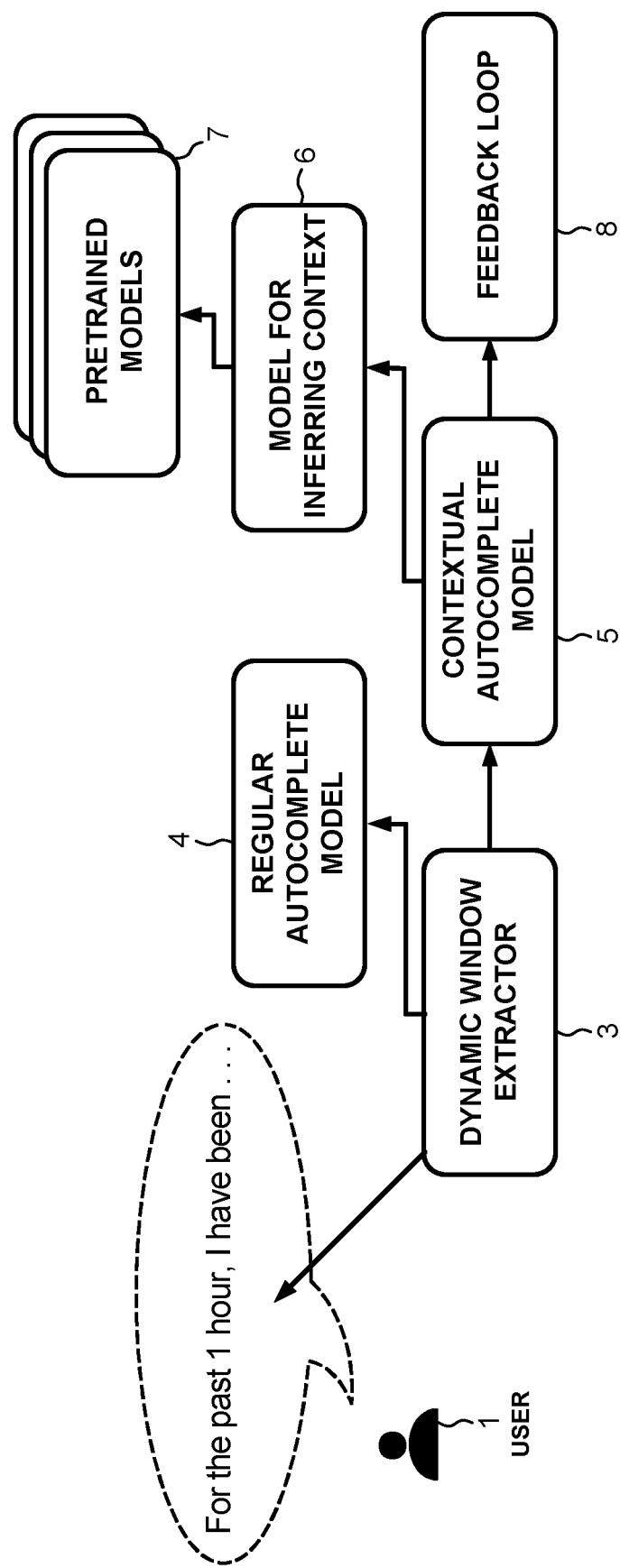
FIG. 2 shows an overview over various components of an embodiment of the invention.

FIG. 2 shows an overview over some components of an embodiment of the invention. In the example of FIG. 2, the user 1 types the input "for the past 1 hour, I have been . . . " into the user interface of his/her smartphone 2. A dynamic time window extractor may be used to define or infer the amount of time or the time window that should be used for extracting context based on sensing data. In this example, the time window relates to the past one hour. A "regular" autocompletion model 4, in particular an autocompletion model that does not consider the situational context of a user, is used to generate a list of words that the user is likely to input next. A contextual autocompletion model 5, in particular an autocompletion model that does consider the situational context of a user, is also used to generate a list of words that the user is likely to input next. The contextual-based autocompletion model 5 draws on a model for inferring context 6 that infers the contextual values based on aggregated sensing data computed based on the dynamic time window inferred by the dynamic window extractor. The model for inferring context 6 draws on in this example several pretrained models 7 covering a variety of values for time windows based on sensing data to infer contextual values. A feedback loop 8 allows the user to provide feedback regarding how accurately the words proposed by the system capture what the user intended to type.

Figure 3:
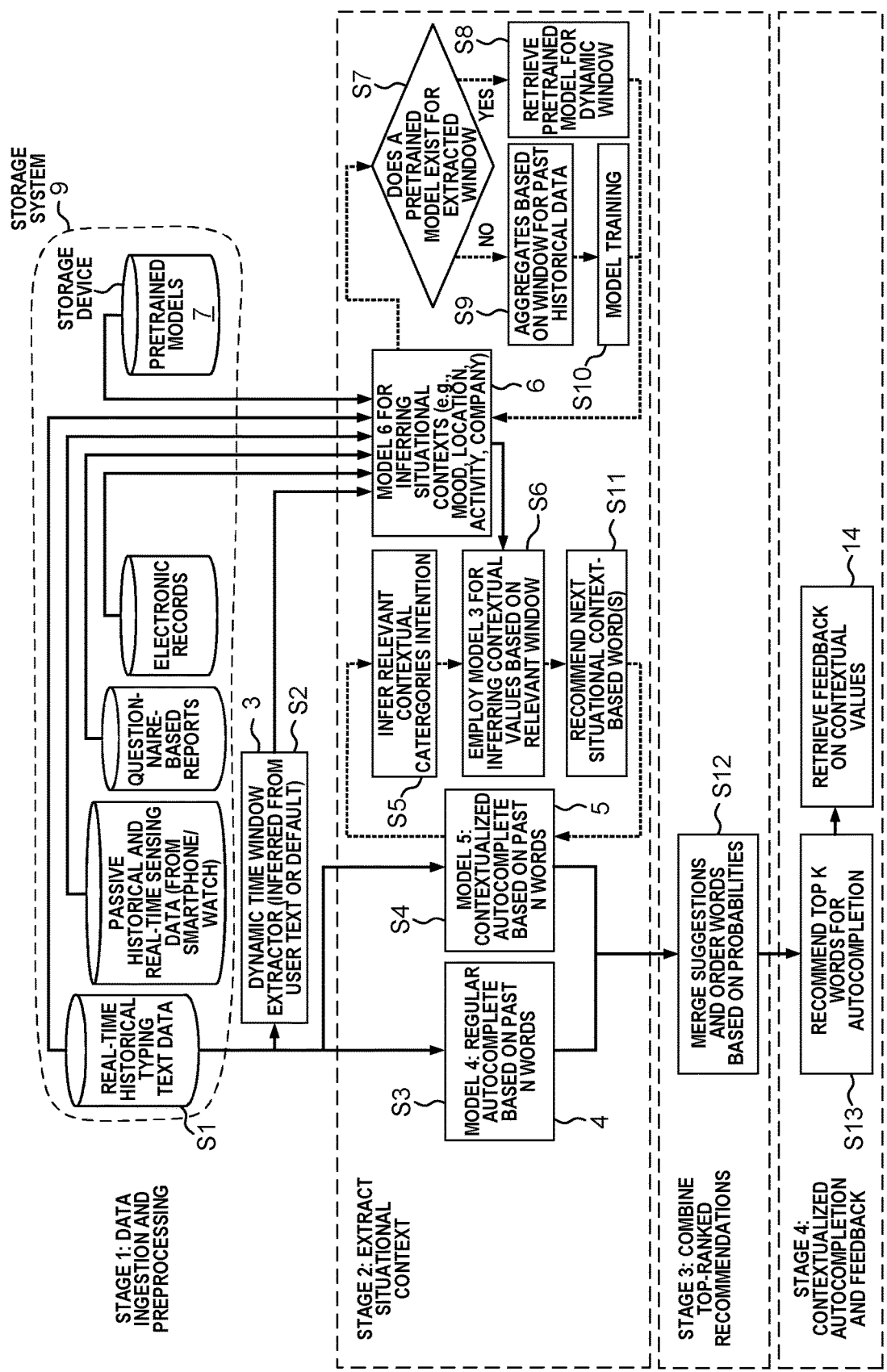
FIG. 3 is a flowchart of various steps of an autocomplete function.

FIG. 3 is a flowchart that describes an exemplary method according to the invention. FIG. 3 shows the steps of the novel method, which are grouped into four stages.

Stage 1 of the method involves data ingestion and pre-processing. In step S1, input from the user 1 is received, for example real-time text data from a user typing on his/her smartphone 2.

The acquired data may include: a) real-time and historical typing text data coming from the user, b) passive event-based/raw historical and real-time sensing data from devices surrounding the user (such as noise level, light level, distance travelled, number of steps), c) questionnaire-based reports (such as demographic information, PHQ-9, ONS-4, GAD-7), and d) electronic records. Some or all of these data may be input into a model for inferring situational context 6. In one embodiment, model 6 is a software module of a system for improving the accuracy of an autocomplete function used on smartphone 2. For example, the autocomplete function can be used by user 1 while undertaking a cognitive behavioral therapy via smartphone 2.

In step S2, a time window is determined, for example by using a dynamic time window extractor 3, also called a time window determining module. The first and foremost preprocessing that this step does is the dynamic window extraction, either based on the user text already inputted, or based on a default value. The value can be extracted based on what the user has either explicitly typed (e.g., in the following text "for the past hour I have been . . . ", the user refers to a 1-hour window), or estimated based on the activity reported by the user (e.g., in the following text "I have slept quite . . . ", the user refers to a sleeping activity, which on average lasts for 7 hours for this user based on past data or general estimates). The default value represents a fixed period of time, such as 1 hour, 2 hours, or 8 hours.

In one embodiment, the default value can be extracted from previous historical text inputs, such as the average duration of time the user referred to in the past (e.g., the user typically refers to the past hour when she writes in her diary). In another variation, different windows may be relevant for different sensors (e.g., 1 hour for noise, but 24 hours for distance traveled).

In stage 2 of the novel method, the situational context of the user is extracted or determined. In step S3, a known autocomplete mechanism or regular autocompletion model 4 is used to predict which words the user is going to type next based on the past N words the user typed. The autocompletion model or module 4 uses known models for predicting the next word(s) based on the given inputs by the user so far. A traditional approach would be to train a model, such as a neural network, based on a past corpus of data of similar textual inputs (e.g., journal entries, text messages, etc). This model outputs the recommended next words based solely on the inputted text and trained model. Each recommended word comes with a probability/rank of relevance.

In step S4, a contextualized autocomplete based on past N words is performed by the contextual autocompletion model 5. The contextual autocompletion model 5 performs the steps S5, S6 and S11.

In step S5, the contextual autocompletion model 5 infers relevant contextual categories of intention. First the model preprocesses the already inputted text to check whether relevant contextual categories have been mentioned by the user, or the user has the intention of mentioning them, such as typing "I am at", this step would identify that the user intends to mention a location category. This step can be performed with a keywords verification, where specific keywords are manually mapped to each contextual category (e.g., at, in, by denote location; with denotes company or colleagues; am feeling denotes mood; doing, having denote activity). In one embodiment, model 5 is a software analysis module that generates situational parameters and temporal parameters based on textual input and sensor data.

In step S6, the contextual autocompletion model 5 employs a model for inferring situational contexts 6 so as to infer contextual values based on the relevant time window extracted in step S2. In one embodiment, model 6 is a model-implementing module that determines whether a pre-existing model exists, and if no pre-existing model exists, creates a new language model. This step leverages a machine learning model, such as the model for inferring context 6, to predict the relevant contextual category value determined in step S5 based on sensing data from smart devices of the user (e.g., smartphone, watch) and potentially those of the surrounding users when access is granted (e.g., partner-based smartphone).

The model for inferring context 6 uses the dynamic window computed in step S2 (e.g., 1 hour) to perform step S6 by performing the following substeps. The model for inferring context 6 performs an aggregation step by aggregating the past sensor readings from the relevant devices, e.g., the smartphone 2, over the relevant window (e.g., past 1 hour, based on having extracted a dynamic window of 1 hour in step S2).

In the aggregation substep, different time windows may be used for different sensor data. For example, only one hour of past noise data may be relevant for predicting mood, whereas a window of 24 hours is used for aggregating the distance traveled or number of steps taken by the user. Alternatively or additionally, the aggregation may be performed over a default window of 24 hours regardless of the dynamic time window determined in step S2.

In step S7, the model for inferring situational contexts 6 evaluates whether a pretrained model exists for the determined time window of the past 1 hour for the user 1.

If a pretrained model for this time window exists, the model for inferring context 6 in step S8 retrieves the pretrained model 7 from the storage system 9 and applies it in order to predict the value of the relevant contextual category using the aggregations from the aggregation step as inputs. The storage system 9 in this example thus stores N pretrained models, where N is the number of dynamic time windows extracted so far from the text the user inputted in the past (e.g., 1 hour, 2 hours, 10 hours, 24 hours, etc.)

If a pretrained model does not exist, the model for inferring context 6 in step S9 aggregates all past historical data over dynamic time-window-based slots (e.g., a row for each 1 hour of historical data available, based on having extracted a dynamic time window of 1 hour in step S2), and trains a machine learning model using this data in step S10.

The model for inferring context 6 then applies the trained model on the aggregations from the past hour, preferably only for predicting the relevant contextual category. Note that the labels are preferably available from past feedback given by the user when the predicted contextual category value was correct.

In a variation, a single pretrained model may be used instead of storing N models for N windows. The single pretrained model preferably receives the size of the dynamic time window as an input feature and also receives time-window-based features and possibly default time-window-based features (24 hours) as well as a binary parameter depending on whether the time-window-based features are used or not.

In another variation, the model for inferring context 6 is not a model based on machine learning, but rather a simplistic popularity based model that retrieves the top contextual value for the category identified from past historical data. For example, the user typically refers to having lunch at home; therefore the model would always suggest home as the location category value, in particular if the time has been determined to be 1 pm.

In another variation, the model for inferring context 6 is a rule-based model that matches different already-specified contextual values to determine a following contextual value based on past historical data (e.g., when the user mentioned in the past she had been having lunch with the family, it was typically at home).

In step S11, the contextual autocompletion model 5 recommends the next words the user is likely to type based on the inferred situational context of the user. The contextual autocompletion model 5 outputs the predicted next words that the user is likely to type next based on the inputted text so far coupled with the contextual categories and values inferred by the contextual autocompletion model 5 and the model for inferring context 6 that may be as follows: I'm having lunch (at location_context:park with company_context:family mood_context:None activity_context:None). Each recommended word is associated with a probability/rank of relevance.

In a variation, step S5 is omitted, and step S11 is altered to include the context-based words as part of the textual input, appropriately tagged (e.g., <tags> park family <tags> I'm having lunch . . . at the park/outside/with family). Each recommended word is associated with a probability/rank of relevance and it is not necessarily one of the context-based words. For example, the location "outside" would be inferred from the park context.

In a variation, the context is not inferred but given as input by the user and used by the contextual autocompletion model 5 directly.

In stage 3 of the novel method, the ranked recommendations of words to be displayed as an auto-complete from the regular autocompletion model 4 and the contextual autocompletion model 5 are combined or merged in step S12.

In step S12, the recommendations are merged and the words are ordered based on probabilities. This step takes the outputs from steps S3 and S11, merges the words with their associated probabilities, reorders them based on the probabilities and produces as output a reordered or integrated/merged list. In one embodiment, step S12 is performed by a situational autocomplete module that generates a list of words that the user is likely to input next, wherein the words are ranked by probability that the user is intending to type each of the words.

In a variation, the regular autocompletion model 4 is ignored and only the contextual autocompletion model 5 is used for providing recommendations for autocomplete to the user. In this case, the merging step in S12 is omitted, and the words are ordered based solely on probabilities given by the contextual autocompletion model 5.

In stage 4 of the novel method, an autocompletion is performed on the graphical user interface of the user by taking into consideration the contextual and/or situational context of the user based on real-time inputs received from the user. In step S13, the system recommends the top K words for autocompletion. This step displays only the top K words for autocompletion to the user, e.g., the three most likely words, based on the ordered list from step S12. K can be defaulted to N regular words and M contextual words (e.g., 3 and 3).

In step S14, feedback is retrieved from the user relating to the contextual values. For example, the user may be asked to rate, e.g., on a scale from 1 to 10, how accurately the recommended words reflect what he/she actually intended to type. A closed loop system may be employed wherein the user is prompted to give feedback on the contextual values suggested by the system. When the feedback is positive, this entry is incorporated back into the storage system 9 where the input is the aggregation from the aggregation step performed by the model for inferring context 6, and the labels are the contextual categories and values to be able to further use this for training in the future. In other words, the feedback provided by the user is used to continuously train and improved the models.

The steps disclosed above are further illustrated referring to the following example.

In stage 1 of the novel method, a user 10 has a mobile application (app) on his mobile device for managing stress at a subclinical level, which collects background passive information from the smartphone sensors, in this case leveraging iCoreMotion. User 10 is currently using a journaling module of the app that prompts him to describe how he feels. For example, journaling can be a personalized wellbeing intervention that helps the user to achieve a desired emotional state as part of a cognitive behavioral therapy (CBT). In this example, the system makes autocomplete suggestions to user 10 based on his mood, which is identified via the passive data collected by the smartphone sensors.

Relating to data collection, past passive data from the smartphone of user 10 are collected including noise level, light level, distance traveled, and number of steps taken. On the textual data side, past user inputs are collected. Also, the text that user 10 has already input in real time is collected as the user types: "Today, I have been feeling . . . ."

FIG. 4 is a table listing a sample of passive data for user 10 acquired over the previous 24 hours.

From the textual input "Today", the dynamic window size is determined to be 20 hours because the local user time is 8 pm (20:00 h).

In stage 2 the situational context is extracted. The regular autocomplete model 4 is based on an open-source pretrained language model (e.g., GPT-2 from the Transformers library). This model is then fine tuned using user 10's historical text data. The regular autocomplete model 4 takes the real-time textual input and produces three word recommendations. The probability relates to how likely the user is to type the word next. In this example, the regular autocomplete model 4 recommends as the next word:

a. happy with probability 0.15
b. sad with probability 0.12
c. stressed with probability 0.10

The contextual autocompletion model 5 performs the following steps:

From the textual input keyword "feeling", it is inferred that the relevant contextual category is "Mood". Using the dynamic window of 20 hours determined in step S2, sensor data is aggregated for the previous 20 hours into the following exemplary features:

i. "average_noise_level": the average value of noise in the previous 20 hours, in dB.

ii. "sum_steps": the total number of steps taken by user 10 during the previous 20 hours.

iii. "sum_distance": the total distance traveled by user 10 during the previous 20 hours, in meters.

iv. "average_light_level": the value of the average light level during the previous 20 hours, in lux.

FIG. 5 is a table listing the values of these four exemplary features for user 10.

From the storage system 9, the pretrained model corresponding to 20 hours of data is retrieved. The values of the features shown in FIG. 5 are then input into the model for inferring context 6, which gives the output "tired" for the mood of user 10, with a probability of 0.4.

The input text, the inferred category ("Mood") and the value for user 10's mood computed by the pretrained model for inferring context 6 are combined. Then the contextual autocompletion model 5 outputs the recommendation "tired", with the probability of 0.4.

In stage 3 of the novel method, the top-ranked recommendations are combined. In this stage, word recommendations from the regular autocompletion model 4 and the contextual autocompletion model 5, which were previously computed, are merged. These words are then ordered in a merged list as follows:

a. tired with probability 0.4
b. happy with probability 0.15
c. sad with probability 0.12
d. stressed with probability 0.10

Figure 6:
FIG. 6 shows an exemplary graphical user interface used in the context of the present invention.

In stage 4 of the method, an autocompletion taking into consideration the contextual and/or situational context of the user is performed based on real-time inputs received from the user. The top K words from the merged list are recommended for autocompletion in this example. For example, if K=3, the first three words are displayed to the user on the graphical user interface of the smartphone 2, as shown in FIG. 6. Thus, the user 10 is presented with the autocompletion options, "Today, I have been feeling tired/happy/sad." In one implementation, by selecting an autocompletion recommendation, the user 10 is performing a journaling task that is a wellbeing intervention and part of a cognitive behavioral therapy (CBT).

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for autocompleting a textual input of a user, comprising:
   receiving the textual input of the user via a user interface of a smartphone of the user;
   generating a situational parameter relating to the user based on the textual input and on sensor data from a user sensor;
   generating a temporal parameter based on the textual input and on the sensor data;
   defining a time window in the past based on the situational parameter and the temporal parameter;
   retrieving from a storage device historical textual input and historical sensor data acquired during the time window and relating to the situational parameter;
   aggregating the historical textual input and the historical sensor data relating to the situational parameter that was acquired during the time window;
   determining whether, for the user, a pre-existing model exists that relates the situational parameter to the time window;
   using the pre-existing model, if the pre-existing model exists, to select a situational value relating to the situational parameter based on the historical textual input and the historical sensor data that has been aggregated;
   aggregating the historical textual input and the historical sensor data relating to the situational parameter, if no pre-existing model exists, in time slots of equal length to the time window;
   creating a language model, if no pre-existing model exists, using the historical textual input and the historical sensor data that has been aggregated;
   selecting, if no pre-existing model exists, the situational value relating to the situational parameter using the language model that has been created;
   generating a first list of words that the user is likely to input next based on the situational value that has been selected, wherein the words relate to the situational parameter;
   ranking the words of the first list by probability that the user is intending to type each of the words; and
   displaying to the user on the user interface a word ranked highest on the first list.

2. The method of claim 1, wherein the user sensor is selected from the group consisting of: a sensor on the smartphone of the user, a sensor on a wearable device of the user, and a sensor on a personal electronic device of the user.

3. The method of claim 1, wherein the words of the first list are ranked using the pre-existing model or the language model based on a combination of the probability of the user's intent and an association of the words with a targeted mental state of the user.

4. The method of claim 1, wherein the words of the first list are ranked based on a combination of the probability that the user is intending to type each of the words and an association of the words with a targeted mental state of the user.

5. The method of claim 1, further comprising:
   generating a second list of words that the user is likely to input next based on the textual input of the user received via the user interface; and
   merging the first list and the second list to generate an integrated list of words that the user is likely to input next, wherein the words of the integrated list are ranked by probability that the user is intending to type each word.

6. The method of claim 1, further comprising:
   receiving feedback from the user regarding the word displayed to the user on the user interface, wherein the feedback indicates whether the word is related to the situational parameter;
   using the feedback to improve the pre-existing model, if the pre-existing model exists; and
   using the feedback to create the language model, if no pre-existing model exists.

7. The method of claim 1, wherein the time window is defined in part based on an explicit input by the user.

8. The method of claim 1, wherein the time window is defined as a default time window.

9. The method of claim 1, wherein the situational parameter is generated in part based on a default value that is associated with the textual input.

10. The method of claim 1, further comprising:
    generating a second situational parameter based on the textual input;
    retrieving historical textual input and historical sensor data relating to the second situational parameter; and
    aggregating the historical textual input and the historical sensor data relating to the situational parameter and the second situational parameter.

11. The method of claim 10, further comprising:
    defining a second time window based on the second situational parameter.

12. The method of claim 1, wherein the situational parameter relates to a characteristic selected from the group consisting of: a mood, a physical location, a surrounding environment, an activity level, and a social interaction.

13. The method of claim 1, wherein the situational parameter involves a parameter related to the user selected from the group consisting of: a heart rate, a breathing rate, a GPS coordinate, a noise level experienced by the user, a light level experienced by the user, a time of day, a season, a distance traveled by the user, and a number of steps taken by the user.

14. The method of claim 1, wherein the language model is created in part using a characteristic of the user selected from the group consisting of: age, sex, ethnicity, demographic group, profession, personality type and medical condition indicated in electronic health records.

15. The method of claim 1, wherein the word displayed to the user on the user interface is selected from the first list based on an activity undertaken by the user in the past.

16. The method of claim 1, wherein the word displayed to the user on the user interface is selected from the first list based on a predicted future activity of the user.

17. The method of claim 1, wherein the storage device stores a database of electronic health records.

18. The method of claim 1, further comprising:
retrieving from the storage device electronic health records relating to the user; and
using the pre-existing model to select the situational value based in part on the electronic health records.

19. A system for autocompleting a textual input of a user, comprising:
a user interface on which the textual input is received from the user;
an analysis module that generates a situational parameter of the user and a temporal parameter based on the textual input;
a time window determining module that defines a time window in the past based on the temporal parameter and the situational parameter;
a storage device from which the analysis module retrieves historical textual input and historical sensor data that was acquired during the time window and that relates to the situational parameter, wherein the analysis module aggregates the historical textual input and the historical sensor data relating to the situational parameter that was acquired during the time window;
a model-implementing module that determines whether, for the user, a pre-existing model exists that relates the situational parameter to the time window, wherein the model-implementing module uses the pre-existing model, if the pre-existing model exists, to select a situational value from the situational parameter based on the historical textual input and the historical sensor data that has been aggregated, wherein the analysis module aggregates the historical textual input and the historical sensor data relating to the situational parameter, if no pre-existing model exists, in time slots of equal length to the time window, wherein the model-implementing module creates a language model, if no pre-existing model exists, using the historical textual input and the historical sensor data that has been aggregated, and wherein the analysis module selects, if no pre-existing model exists, the situational value from the situational parameter using the language model that has been created; and
a situational autocomplete module that generates a list of words that the user is likely to input next based on the situational value that has been selected, wherein the words relate to the situational parameter, wherein the situational autocomplete module ranks the words of the list by probability that the user is intending to type each of the words, and wherein a word that is ranked highest on the list is displayed to the user on the user interface.

20. The system of claim 19, wherein the words of the list are ranked using the pre-existing model or the language model based on a combination of the probability of the user's intent and an association of the words with a targeted mental state of the user.

21. The system of claim 19, wherein the words of the list are ranked based on a combination of the probability that the user is intending to type each of the words and an association of the words with a targeted mental state of the user.

22. The system of claim 19 wherein the situational parameter relates to a characteristic selected from the group consisting of: a mood, a physical location, a surrounding environment, an activity level, and a social interaction.

23. The system of claim 19, wherein the situational parameter involves a parameter related to the user selected from the group consisting of: a heart rate, a breathing rate, a GPS coordinate, a noise level experienced by the user, a light level experienced by the user, a time of day, a season, a distance traveled by the user, and a number of steps taken by the user.

24. The system of claim 19, wherein the language model is created in part using a characteristic of the user selected from the group consisting of: age, sex, ethnicity, demographic group, profession, personality type and medical condition indicated in electronic health records.

25. The system of claim 19, wherein the word displayed to the user on the user interface is selected from the list based on an activity undertaken by the user in the past.

26. The system of claim 19, wherein the word displayed to the user on the user interface is selected from the list based on a predicted future activity of the user.

* * * * *